Nov. 15, 1949  S. RUBEN  2,487,985
THERMOPLASTIC CONDUCTIVE JOINT FOR FLAT CELLS
Filed Nov. 21, 1945

INVENTOR
Samuel Ruben
BY Chester F. Carlson
ATTORNEY

Patented Nov. 15, 1949

2,487,985

UNITED STATES PATENT OFFICE 2,487,985

THERMOPLASTIC CONDUCTIVE JOINT FOR FLAT CELLS

Samuel Ruben, New Rochelle, N. Y.

Application November 21, 1945, Serial No. 630,071

11 Claims. (Cl. 136—111)

This invention relates to methods of joining together electric cells.

An object of the invention is to improve methods of joining cells together and the product resulting therefrom.

Other objects of the invention will be apparent from the following description and accompanying drawings taken in connection with the appended claims.

Figures 1, 2, 3:
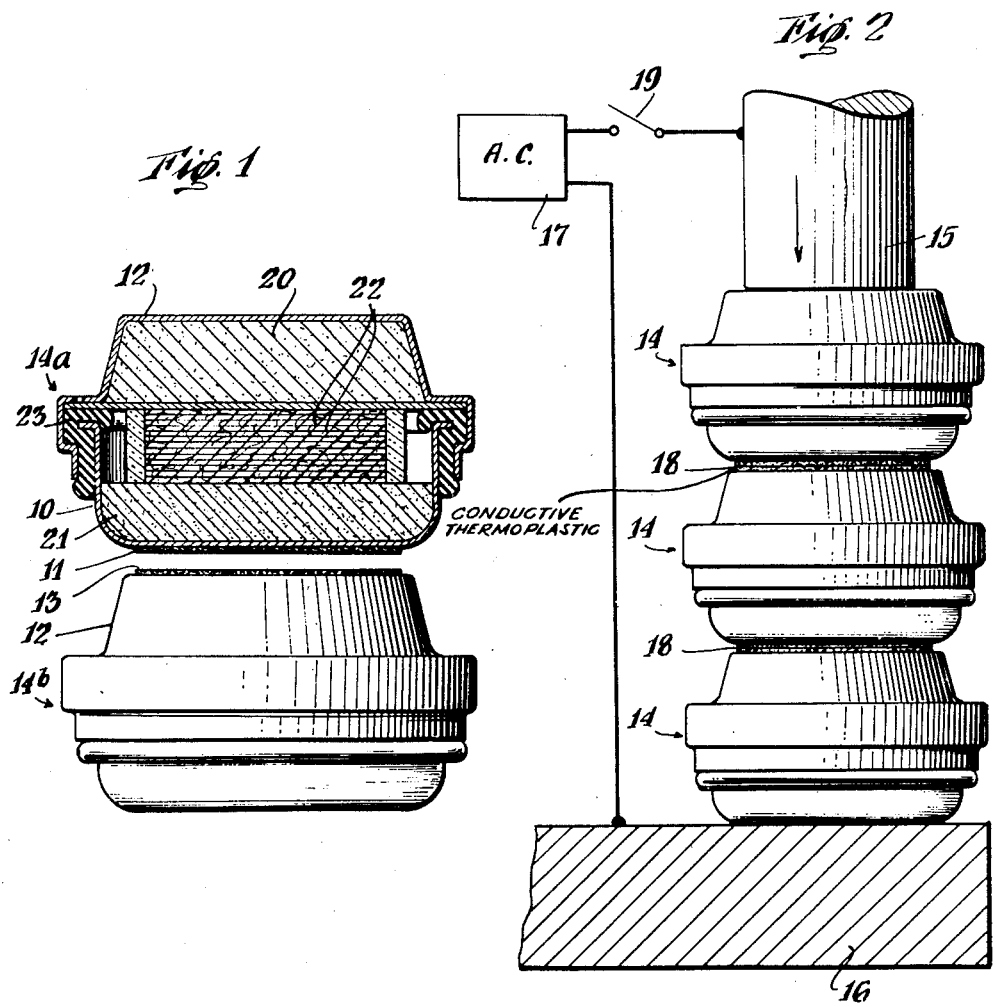
Figure 1 illustrates a pair of primary cells prepared for joining.
Figure 2 shows three cells in process of being joined.
Figure 3 illustrates a modified assembly preparatory to joining.

It is often necessary to connect a group of electric cells or electrolytic devices together. For example, primary cells are often connected in series to form batteries. It is desirable to have a stable and permanent conductive bond between the cells in order to prevent changes in resistance of the connection during life and to obtain a good low resistance connection at all times. However, if it is attempted to join completed cells by soldering, welding or brazing the heat of the operation is liable to damage the interior of the cell. Moreover, if the cells or cell terminals are formed of certain metals such as zinc, magnesium or aluminum which do not weld or solder readily further difficulties are encountered.

The present invention contemplates a method of joining cells together with a conductive thermoplastic resin composition such as a thermoplastic resin intimately mixed with a conductive material, for example, graphite. The thermoplastic resins contemplated by the invention are of such character as to become adhesive when heated to a suitable bonding temperature and to form upon cooling a strong and permanent bond with a surface with which they are in pressure contact. According to the preferred method a layer of the thermoplastic conductive material is interposed between the cells to be joined and alternating current is passed through the cells and the joint to produce resistance heating of the resin with resulting softening and bonding together. The use of alternating current makes it possible to pass the current through the cells without damage.

Referring to the drawings, Figure 1 illustrates an assembly preparatory to joining comprising a pair of primary cells 14a, 14b. Cell 14a, shown in cross-section, comprises a pair of cell electrodes 20 and 21 spaced apart by a layer 22 of porous material, such as paper, impregnated with a primary cell electrolyte such as a potassium hydroxide solution. The electrodes are enclosed in the cell container which comprises metal cups 10 and 12 crimped together with an insulating grommet ring 23 interposed between them. Cups 10 and 12 comprise the opposite terminals of the completed cell. Cell 14b may be similar. It is obvious that other cells of widely different construction, composition and function can be joined by the process described herein.

The terminal cup 10 of cell 14a is coated on the outer face thereof with a layer of thermoplastic conductive resin composition 11. The opposite-polarity terminal 12 of the next adjacent cell is also coated with the resin in a layer 13. As many cells as it is desired to connect in series are stacked up with resin layers between them and an alternating current is passed through the stack to effect a softening and bonding of the resin layers. With alternating current there is no material effect on the internal electro-chemistry of the cells as the current passes through them.

Figure 2 shows a stack of primary cells 14 in the process of being joined together in series. The cells are clamped under pressure between a metal electrode 15 and metal base plate 16 which are connected respectively to the opposite output terminals of an A. C. source 17 through suitable switching means 19. The cells 14 are coated on adjacent top and bottom surfaces with conductive resin as described in connection with Figure 1, but the top and bottom of the stack are, of course, not so coated. Alternating current is passed through the stack of cells to heat and bond the resin layers together into integral layers 18 and then the current is cut off. The time and intensity of current is controlled to effect sufficient heating to bond the resin layers together but insufficient to effect any substantial heating of the cells themselves. Consequently, as soon as the current is cut off the small amount of heat generated at the joints is rapidly dissipated and the resin layers 18 solidify into strong permanent conductive bonds. The completed assembly comprises a three-cell battery.

Figure 3 illustrates a modified assembly comprising cells 114a and 114b and heat conductive thermoplastic sheet 111 interposed between them. Sheet 111 may be a self-supporting disc of conductive resin or may be a fibrous material such as porous paper impregnated with the resin. This assembly may be joined in the same manner by passing current through the assembly to raise the surfaces of sheet 111 to bonding temperature.

A variety of thermoplastic or thermo-adhesive resins are useful. Such synthetic resins as vinylidene chloride, polyvinyl chloride, polyvinyl formal, and polyvinyl butyrol and particularly suitable. Other suitable materials include ethyl cellulose, and natural resins such as rosin compositions, shellac and the natural gums. In each case a quantity of finely divided conductive material is added to the resin and intimately mixed therewith, preferably in a solvent suspension. Micronized graphite or finely divided carbon are the preferred conductive material although finely divided metals may be used. The proportions may be varied depending on the resistance desired, about 40 to 45% of conductive material being suitable for most purposes.

One successful bonding material has been made from a thermoplastic adhesive compound sold commercially as Plio-bond. This material contains about 20% resin solids in a solvent of methyl ketone type. To this solution is added 15% by weight of micronized graphite of about 3 to 5 micron size. The suspension is thoroughly mixed. For bonding purposes it may be applied as a coating to the metal surfaces to be joined and the solvent allowed to dry before the surfaces are placed in contact.

Air drying of the coated metal surfaces for 24 hours is desirable although the coatings may be force-dried for 1 hour at an elevated temperature if desired.

The bonding process described herein is described and claimed broadly for general purposes in my co-pending application Serial No. 630,072 filed November 21, 1945, for Electroplastic welding.

While specific embodiments of the invention have been described, it is intended to cover the invention broadly within the spirit and scope of the appended claims.

What is claimed is:

1. A battery comprising a stack of primary cells each having a top and a bottom face which comprises its respective terminal, and a layer of thermoplastic adhesive conductive organic material interposed between the top and bottom of each pair of adjacent cells and bonded thereto.

2. A battery comprising a stack of primary cells each having a top and a bottom face comprising opposite terminals of said cell, and a layer of conductive resin composition comprising a thermoplastic adhesive resin mixed with graphite interposed between each adjacent pair of cells and bonded respectively to their adjacent faces.

3. A battery comprising a stack of primary cells each having a top and a bottom face which comprises its respective terminal, and a layer of thermoplastic adhesive conductive organic material interposed between the top and bottom of each pair of adjacent cells and bonded thereto, said material being of such character as to become adhesive when heated to a suitable bonding temperature and to form upon cooling a strong and permanent bond with the faces of said terminals.

4. A battery comprising a group of cells connected in series, adjacent pairs of said cells having juxtaposed terminal surfaces, the electrical and mechanical connection between said pairs of cells comprising a joint of conductive thermoplastic adhesive resin interposed between and bonded to the terminal surfaces of opposite polarity of adjacent cells.

5. A battery comprising a group of primary cells connected together, the terminal surfaces of adjacent cells being arranged in substantially parallel-spaced position and being joined by an interposed layer of a conductive thermoplastic adhesive resin composition bonded thereto and constituting an electrical and mechanical connection between said adjacent cells.

6. A battery comprising a group of primary cells connected together, the respective terminals of adjacent cells being arranged in closely spaced position and being joined by an interposed layer of a thermoplastic adhesive resin composition bonded to said terminals, said layer of resin composition having a conductive material intermixed therewith and constituting electrical and mechanical connection between adjacent cells.

7. A battery comprising a stack of primary cells each having a pair of surfaces constituting its respective terminals, and an electrical and mechanical connection between the corresponding surfaces of adjacent cells, said connection comprising a layer of thermoplastic adhesive conductive organic material interposed between and bonded to said surfaces.

8. A battery comprising a stack of primary cells each having a top and bottom face which comprises its respective terminals, and a layer of thermoplastic adhesive conductive organic material interposed between the top and bottom faces of each pair of adjacent cells and bonded thereto, said material having such resistive characteristics as to become plastic and adhesive upon the passage of bonding current of suitable intensity therethrough but being substantially unaffected by the normal load current of the battery.

9. A battery comprising a stack of primary cells each having a top and bottom face which constitutes its respective terminals, and a layer of thermoplastic adhesive conductive organic material interposed between the top and bottom faces of each pair of adjacent cells and bonded thereto, said material comprising a matrix of thermoplastic adhesive resin having finely divided conductive material intimately mixed therewith.

10. The battery as claimed in claim 9 in which the finely divided conductive material is graphite.

11. The battery as claimed in claim 9 in which the conductive material is finely divided metal.

SAMUEL RUBEN.

REFERENCES CITED

The following references are of record in the file of this patent:

UNITED STATES PATENTS

| Number | Name | Date |
| --- | --- | --- |
| Re. 22,301 | Pitman | Apr. 13, 1943 |
| 1,613,585 | Dam | Jan. 4, 1927 |
| 1,613,586 | Dam | Jan. 4, 1927 |
| 1,624,455 | Yngve | Apr. 12, 1927 |
| 2,093,390 | Wyckoff | Sept. 14, 1937 |
| 2,116,091 | Williams | May 3, 1938 |
| 2,154,312 | MacCallum | Apr. 11, 1939 |
| 2,321,071 | Ehrhardt et al. | June 8, 1943 |
| 2,375,181 | Williams | May 1, 1945 |
| 2,390,863 | Amidon et al. | Dec. 11, 1945 |
| 2,433,566 | Lamb | Dec. 30, 1947 |

FOREIGN PATENTS

| Number | Country | Date |
| --- | --- | --- |
| 269,977 | Great Britain | Apr. 27, 1927 |

OTHER REFERENCES

Rose, "Metals and Alloys," Oct. 1944, pages 959, 960.